United States Patent [19]
Campagnolo

[11] Patent Number: 6,132,327
[45] Date of Patent: Oct. 17, 2000

[54] SYSTEM AND METHOD FOR CONTROLLING A BICYCLE FRONT DERAILLEUR

[75] Inventor: Valentino Campagnolo, Vicenza, Italy

[73] Assignee: Campagnolo S.r.l., Vicenza, Italy

[21] Appl. No.: 09/350,182

[22] Filed: Jul. 9, 1999

[30]    Foreign Application Priority Data

Sep. 9, 1998 [IT] Italy ................... T098A0759

[51] Int. Cl.⁷ ............... F16H 63/00; F16H 7/22
[52] U.S. Cl. .............................. 474/80; 474/103
[58] Field of Search .................... 474/69, 70, 71, 474/72, 77, 78, 79, 80, 82, 101, 102, 103, 127

[56]            References Cited

U.S. PATENT DOCUMENTS

| | | | |
|---|---|---|---|
| 5,213,548 | 5/1993 | Colbert et al. | 474/103 |
| 5,356,349 | 10/1994 | Bellio et al. | 474/103 |
| 5,922,035 | 7/1999 | Chen | 474/103 |

*Primary Examiner*—David A. Bucci
*Assistant Examiner*—Matthew A. Kaness
*Attorney, Agent, or Firm*—Sughrue, Mion, Zinn, Macpeak & Seas, PLLC

[57]              ABSTRACT

A system for controlling the front derailleur of a bicycle is described, in which electronic control mechanism are provided for displaying the identifying number of the selected front gear on an electronic display, on the basis of the position of the movable control member for controlling the front derailleur, as detected by sensor mechanism, according to a correlation law which is different depending upon whether the chain is being shifted towards greater gears or smaller gears.

6 Claims, 4 Drawing Sheets

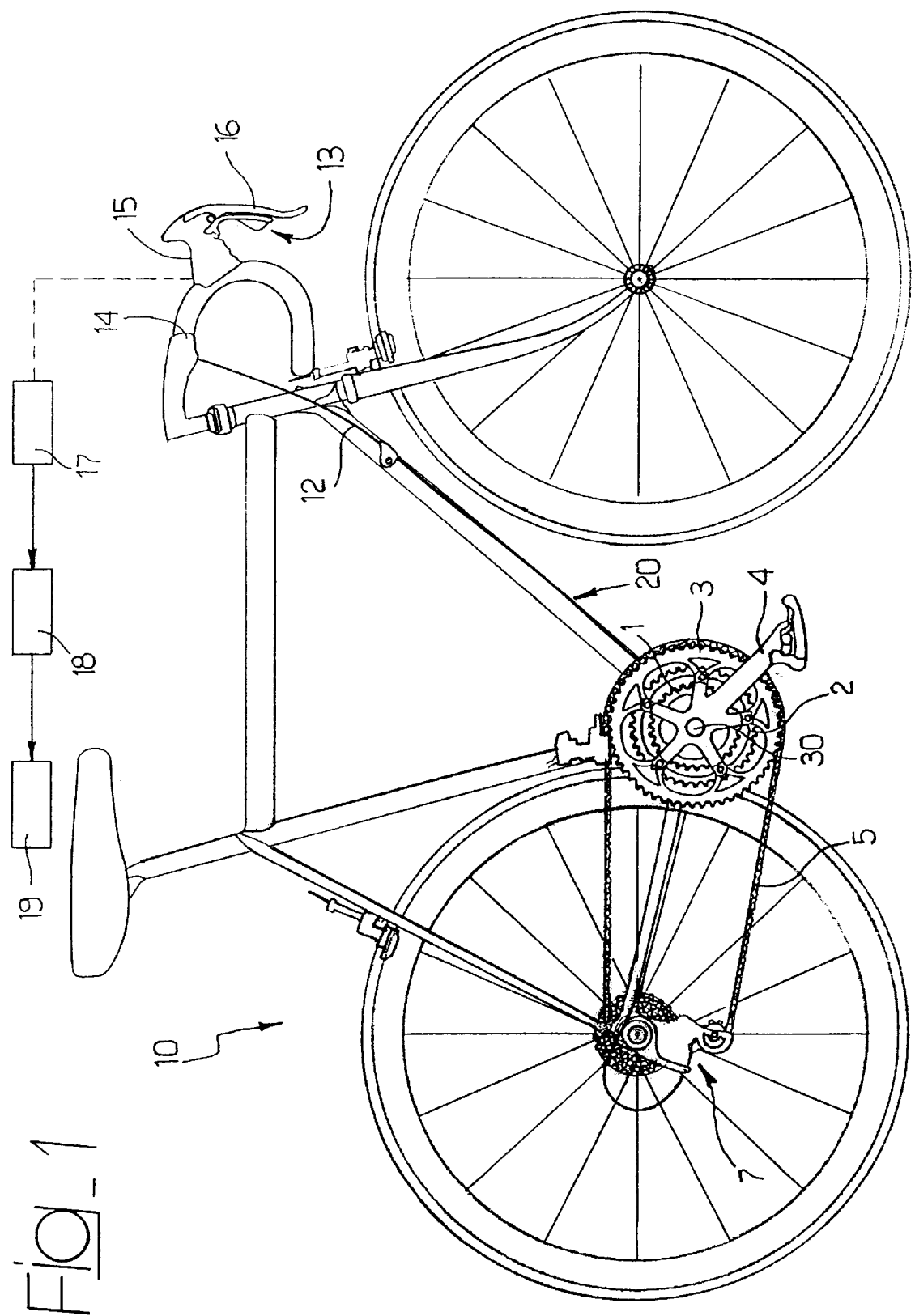
Fig_1

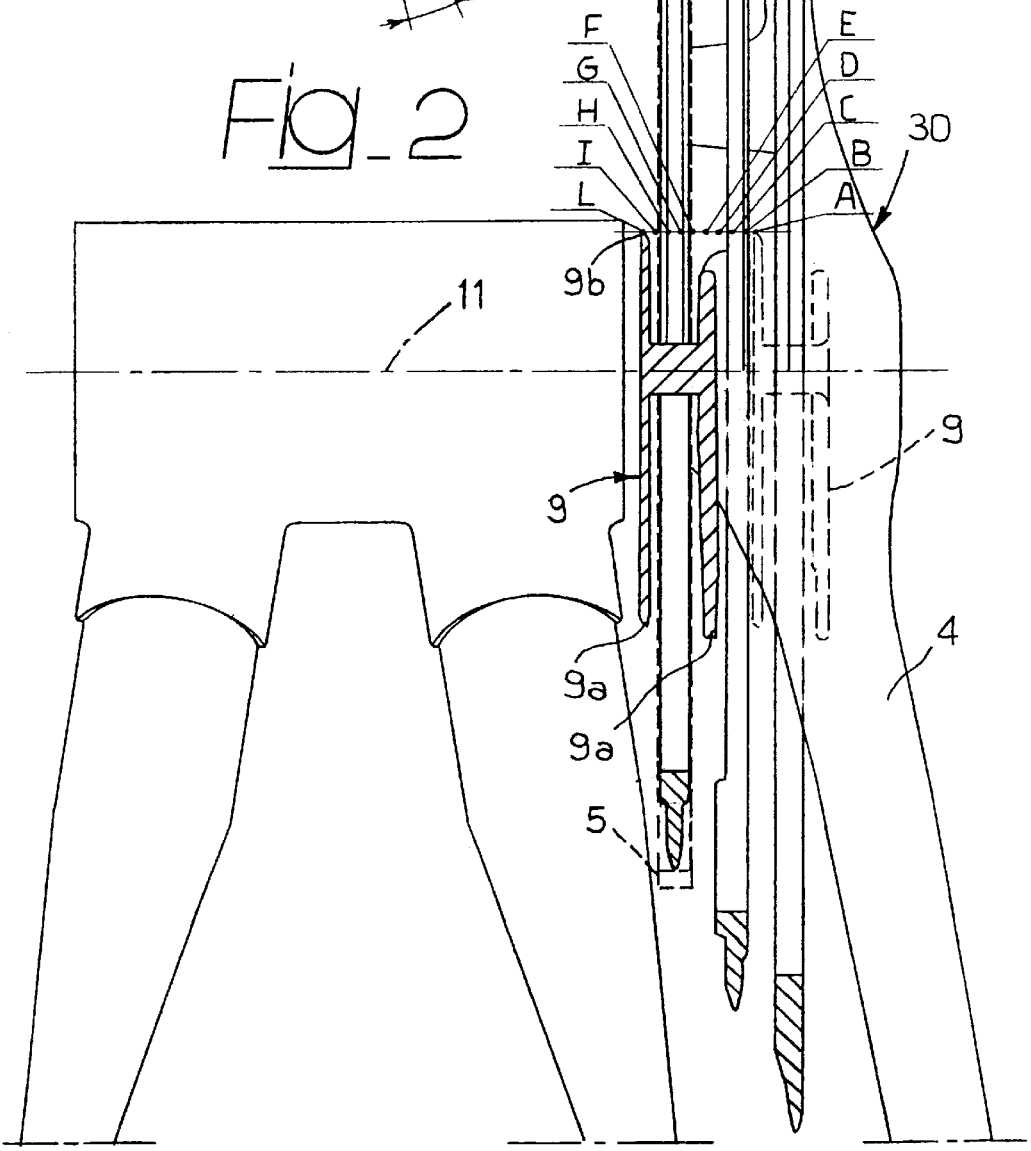

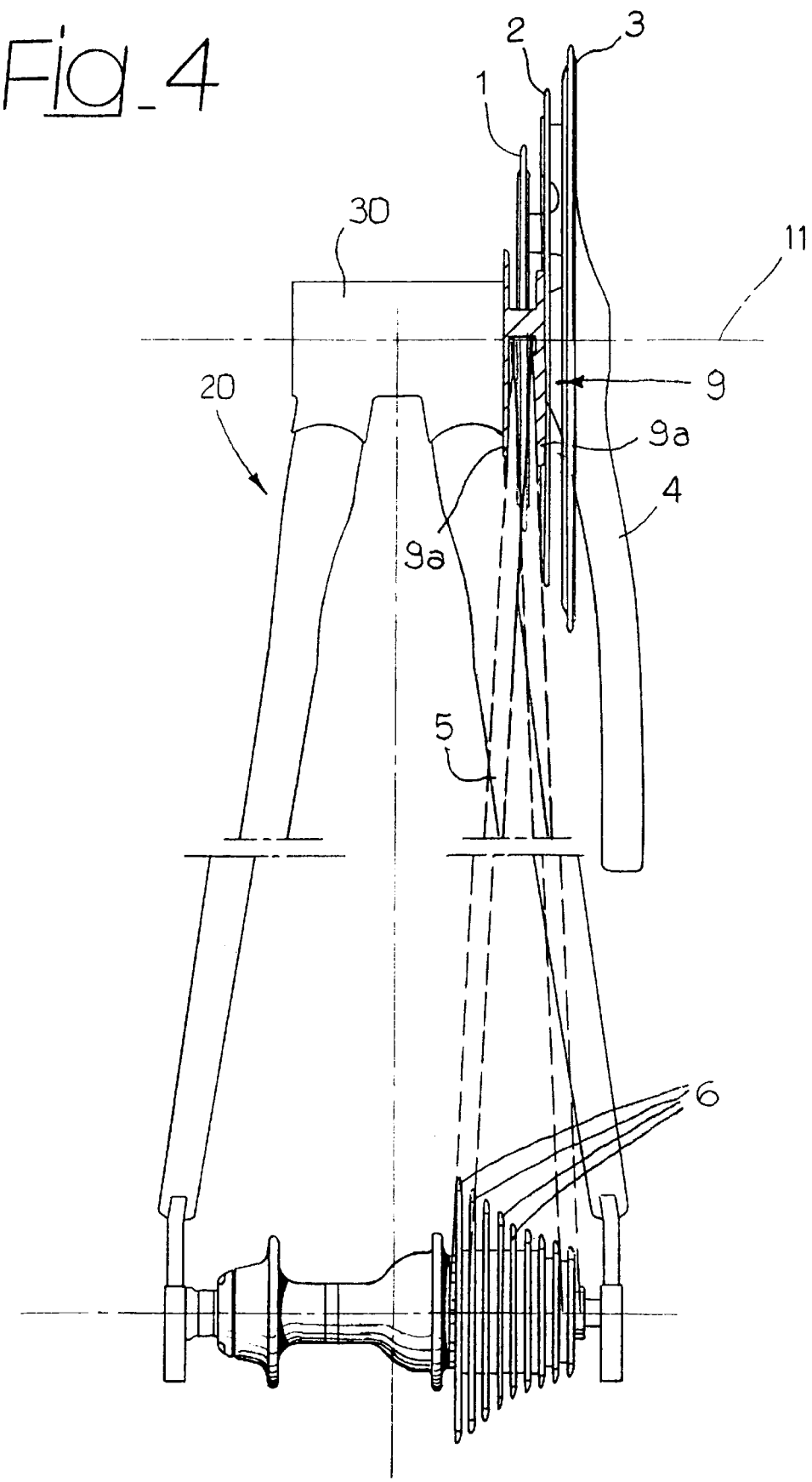

Fig_5
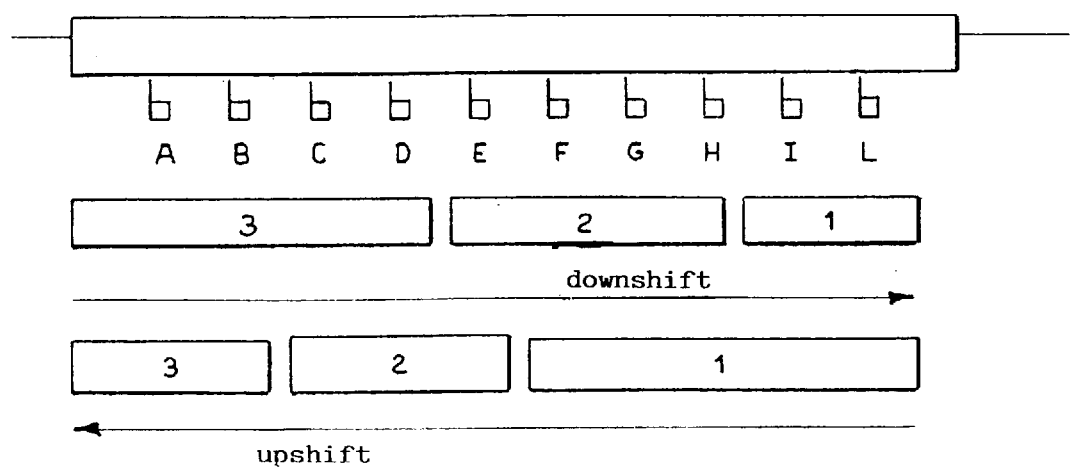

SYSTEM AND METHOD FOR CONTROLLING A BICYCLE FRONT DERAILLEUR

The present invention relates to a system and method for controlling a front derailleur of a bicycle of the type comprising:

a plurality of gears associated with the bicycle crankshaft, a front derailleur mounted on the bicycle frame, comprising a fork member movable in a direction parallel to the axis of the gears to cause the bicycle chain to shift from one to another of said gears, a device for controlling the front derailleur, including a movable control member operatively connected to said movable fork member of the front derailleur by means of a flexible cable, indexing means associated with the movable control member, adapted to define a number of predetermined stable positions of said movable control member, this number being greater than the number of said gears, sensor means for sensing the operative position of said indexing means which is selected by means of said movable control member, an electronic display adapted to display a number or symbol identifying the gear which is being engaged by the chain, and electronic control means mounted on board the bicycle, to receive signals from said sensor means and to cause the number or symbol identifying the selected gear to be displayed on said electronic display on the basis of a predetermined correlation law between the position of said indexing means and the number or symbol to be displayed on the electronic display.

Control systems of the above indicated type have been already marketed. However, the systems of this type which have been made heretofore are not completely satisfactory. In particular, if the electronic display displays a given gear identifying number on the basis of the position of the movable control member as detected by said sensor means, it may happen that the displayed gear number is not that of the gear which is actually engaged by the chain, since a same position of the movable control member may correspond to the engagement of the chain on different gears, depending upon whether the chain has been caused to shift from a smaller gear to a greater gear or viceversa.

The object of the present invention is that of overcoming this drawback.

In view of achieving this object, the invention provides a control system having all the features indicated at the beginning of the present description and further characterized in that said electronic control means are arranged in order to detect whether the derailleur is being driven to shift the chain to a smaller or a greater gear, and to apply different correlation laws, for chain shifts towards smaller or greater gears respectively, between the position of the movable control member as detected by said sensor means and the number or symbol to be displayed on said electronic display.

The invention also provides a method for controlling a bicycle front derailleur, whose main characteristic lies in the above mentioned application of two different correlation laws between the position of the movable control member as detected by said sensor means and the number or symbol to be displayed on said electronic display, respectively for chain shifts towards smaller or greater gears.

Due to the above indicated features, the system and method according to the invention avoid any risk that a wrong gear identifying number is displayed on the electronic display in any condition of use of the front derailleur.

The invention will be now described with reference to the annexed drawings, given purely by way of non limiting example, in which:

FIG. 1 is a diagrammatic side view of a race bicycle provided with a system for controlling the front derailleur according to the present invention, FIG. 2 is a diagrammatic plan view, at an enlarged scale, of the detail II of FIG. 1, FIG. 3 is a diagram showing the different operative positions of the control member of the front derailleur, FIG. 4 is a further diagrammatic plan view which shows the bicycle chain with the gear assembly associated with the bicycle crankshaft and the sprocket assembly associated with the rear wheel of the bicycle, and FIG. 5 is a diagram showing the principle of operation of the system according to the invention.

In FIG. 1, numeral 10 generally designates a race bicycle comprising a frame 20 including a crankshaft 30 to which three gears 1, 2, 3 of increasing diameter are associated. According to the conventional art, the three gears 1, 2, 3 are connected to a pedal crank 4. The three gears 1, 2, 3 are selectively engaged by the chain 5 which also selectively engages the sprockets 6 associated with the hub of the bicycle rear wheel (see also FIG. 4). Also according to the conventional art, the selective engagement of chain 5 on sprockets 6 is controlled by a rear derailleur 7, whereas the selective engagement of the chain 5 on the front gears 1, 2, 3 is controlled by a front derailleur 8. The detailed structure of derailleurs 7, 8 is not described nor shown herein, since it can be made in any known way and it does not fall, taken alone, within the scope of the invention. With reference in particular to the front derailleur 8, the latter has, in a way known per se, a fork member 9 movable transversely relative to the travel direction, i.e. parallel to axis 11 of the crankshaft 30, which fork member has two side vertical wings 9a for driving laterally the chain 5 and causing it to shift from one gear to the other of gears 1, 2, 3 as a result of the movement of member 9 along the direction of axis 11.

With reference again in particular to the front derailleur 8, the movement of the fork member 9 is caused by a flexible cable 12 which is driven by a control device 13 for controlling the front derailleur 8, which is associated to the handlebar 14 of the bicycle. In the illustrated example, the device 13 is of the known type including an actuating lever rotatably mounted on a body 15 which supports a bicycle brake lever 16. However, it is clearly apparent that the invention is applicable to any type of control device for the front derailleur, whichever is the shape of this device and its location on the bicycle. In the particular example illustrated, the control device for the front derailleur is of the type marketed by the applicant under the trademark "ERGOPOWER" and described and shown for example in U.S. Pat. No. 5,479,776, as well as in the parallel German patent No. 44 13 610 and French patent No. 2.704.199.

Also according to the prior art, the device 13 includes a pulley (not shown in the drawings) for winding the cable 12, which is driven in rotation by means of lever 13, as well as indexing means, adapted to define a plurality of stable positions of the control lever 13. These indexing means, are typically constituted by spring means carried by the supporting body 15 cooperating with a toothed wheel connected in rotation to lever 13. These indexing means are visible for example in the above mentioned U.S. Pat. No. 5,479,776 of the applicant.

FIG. 3 of the annexed drawings diagrammatically shows ten different operative stable positions which can be assumed by the control device 13 of the front derailleur 8, respectively designated by letters A, B, C, D, E, F, G, H, I and L. In the illustrated example, as shown in FIG. 3, these positions are spaced apart from each other by an angle of 11°. This means that the cyclist, by actuating lever 13, can cause a rotation of the lever from one position to the other of the positions A–L by subsequent snap engagements. As shown, the number of stable positions which can be assumed by the control lever 13 is greater than 3, i.e. is greater than the number of gears which can be selected by the front derailleur 8.

Also according to the prior art, to the control device 13 for the front derailleur there is associated a sensor device 17 (shown diagrammatically in FIG. 1) adapted to detect the position of the control lever 13 among the possible positions A–L. For instance, this sensor can be a potentiometer type sensor and can be directly associated with the shaft of the cable winding pulley which is driven in rotation by control lever 13, such as proposed in Italian patent application No. TO98A000492 filed Jun. 5, 1998, of the same applicant. Also according to the prior art, the signals coming from the sensor means 17 are sent to electronic control means 18, diagrammatically shown in FIG. 1 (typically an on-board computer) which control displaying of the front gear number selected (i.e. either 1 or 2 or 3) as a function of the operative position of the control device 13 detected by the sensor means 17. The above mentioned number is displayed on an electronic display 19 associated with the bicycle handlebar and preferably associated with the supporting body 15 for the brake lever, such as shown in U.S. Pat. No. 5,676,021 of the applicant.

In FIG. 2, there are shown ten different positions which can be assumed by the left front end 9b of the fork member 9 at the ten positions A–L of the control device.

In the operation of a system of the above described type, it may happen that a same position of control device 13 corresponds a different gear of gears 1, 2, 3 being engaged by the chain, depending upon whether the chain is shifting towards a smaller gear or a greater gear.

For example, by actuating the control device to bring the chain from the small gear 1 to the medium gear 2, the chain shift takes place between position F and position E of the control device 13. Once the chain shifted has been caused, it is necessary to bring the control device back by one notch, to the position G, so as to position the fork member of the derailleur centrally for best use of all the nine sprockets 6 (see FIG. 4) without causing the chain to slide against one of the two wings 9a of the fork member 9. In order to bring the chain back to the small gear 1, it is necessary to bring the control device to its end position by going down of three positions, to position L. It can be shown that by going down of only one position, i.e. to position H, the chain remains engaged on the medium gear 2 and can be used without any sliding thereof against the fork member only on the greatest sprocket 6. A similar behaviour takes place in the passages between the medium gear and the greater gear 3. As a result, there is a problem if one wants to show the gear selected of the three gears 1, 2, 3 on the electronic display 19 on the basis of the detected position of the control device 13. It is indeed impossible to establish whether for instance positions H and G of the control device always correspond to a selection of medium gear 2 or the smaller gear 1, since, as already indicated, the selected gear is different as a function of the shift direction of the chain.

In order to solve this problem, the electronic control means 18 are provided in order to detect the chain shift direction (due to a comparison between the position detected at every instant with the previously detected position) as well as in order to apply a correlation law between the detected position of the control device 13 and the gear number displayed on display 19 which is different in the two cases of chain shift towards smaller gears or greater gears.

In a preferred embodiment, the above mentioned result is obtained on the basis of the diagram shown in FIG. 5. This figure shows the two correlation laws between detected position of the control device 13 and the displayed gear number, in the two cases of chain shift towards smaller gears (downshift) or greater gears (i.e. upshift). As clearly shown in FIG. 5, in the case of chain downshift, the positions L, I correspond to gear 1; positions H–E correspond to gear 2 and positions D–A correspond to gear 3. However, in the case of chain upshift, all positions L–F inclusive correspond to gear 1, whereas positions E, D, C correspond to gear 2, and positions B, A correspond to gear 3. In other words, if the chain is shifting towards a smaller gear, the display shows the passage from gear 3 to gear 2 at a position intermediate between positions D and E, and the passage from gear 2 to gear 1 at a position intermediate between positions H and I. However, if the chain is shifting towards greater gears, the display displays the passage from gear 1 to gear 2 at a position intermediate between positions F and E and the passage from gear 2 to gear 3 at a position intermediate between positions C and B.

Due to the above mentioned measure, the display is able to automatically display the selected gear engaged by the chain in a reliable manner.

The above described electronic control means can be programmed either at the manufacturing plant, according to a fixed and predetermined criterion as set forth in the foregoing, or it can be programmed also by the cyclist himself while riding the bicycle, through a self-learning technique, by manually imputting for a first time the gear number to be displayed in any stage of operation of the shift control member.

Naturally, while the principle of the invention remains the same, the details of construction and the embodiments may widely vary with respect to what has been described and illustrated purely by way of example, without departing from the scope of the present invention.

What is claimed is:

1. Control system for a bicycle front derailleur, comprising:

a plurality of gears associated with the crankshaft of a bicycle, a front derailleur mounted on the frame of the bicycle, comprising a fork member movable in a direction parallel to axis of gears for causing the chain of the bicycle to shift from one to the other of said gears, a control device for the front derailleur, including a movable control member operatively connected to the fork member of the front derailleur by means of a flexible cable, indexing means associated with the movable control member, adapted to define a number of predetermined stable positions of said movable control member, said number being greater than the number of said gears, sensor means for sensing the operative position of said movable control member, an electronic display adapted to display a number or symbol identifying the gear which is being engaged by the chain, and electronic control means adapted to receive signals coming from said sensor means and to cause the number or symbol identifying the selected gear to be displayed on said electronic display, on the basis of a predetermined correlation law between the detected position of said movable control member and the number or symbol to be displayed on the electronic display, wherein said electronic control means are arranged in order to detect whether the movable control member is being driven to shift the chain to a smaller or a greater gear, and in order to apply two different correlation laws, for chain shifts towards smaller or greater gears respectively, between the position of the movable control member as detected by said sensor means and the number or symbol to be displayed on said electronic display.

2. Control system for a front derailleur according to claim 1, wherein three gears are associated with the bicycle crankshaft and said indexing means are adapted to define ten different predetermined positions of the movable control member, and wherein the correlation law applied when the chain is shifting towards smaller gears provides displaying the passage from the greatest gear to the medium gear at a position of the movable control member intermediate between the fourth and the fifth position of the movable control member, computed starting from the end position towards the greatest gear, whereas the passage from the medium gear to the smallest gear is displayed once the last but two position is passed, whereas in the case of chain shift towards greater gears, the passage from the smallest gear to the medium gear is displayed when the fifth position of the movable control member is passed, computed starting from the end position towards the smallest gear, whereas the passage from the medium gear to the greatest gear is displayed once the last but three position of the movable control member is passed.

3. Control system for a front derailleur according to claim 2, wherein said electronic control means are able to detect the chain shifting direction by comparing the present position of the movable control member as detected by said sensor means, with the previous position of said movable control member as previously detected by said sensor means.

4. Control system for a front derailleur according to claim 1, wherein said electronic control means are able to detect the chain shifting direction by comparing the present position of the movable control member as detected by said sensor means, with the previous position of said movable control member as previously detected by said sensor means.

5. Method for controlling a front derailleur of a bicycle, said bicycle comprising a plurality of gears associated with the crankshaft of the bicycle, a front derailleur mounted on the frame of the bicycle, comprising a fork member movable in a direction parallel to the axis of said gears for causing the chain of the bicycle to shift from one to the other of said gears, a control device for the front derailleur, including a movable control member operatively connected to the fork member of the front derailleur by means of a flexible cable, indexing means associated with the movable control member, adapted to define a number of predetermined stable positions of said movable control member, said number being greater than the number of said gears, sensor means for sensing the operative position of said movable control member, an electronic display adapted to display a number or symbol identifying the gear which is being engaged by the chain, and electronic control means adapted to receive signals coming from said sensor means and to cause the number or symbol identifying the selected gear to be displayed on said electronic display on the basis of a predetermined correlation law between the detected position of said movable control member and the gear identifying number or symbol to be displayed on the electronic display, wherein said method comprises detecting, during each chain shift, whether the movable control member is being driven to shift the chain to a smaller or a greater gear, said method further comprising applying two different correlation laws, for chain shifts towards smaller or greater gears respectively, between the position of the movable control member as detected by said sensor means and the gear number or symbol to be displayed on said electronic display.

6. Method according to claim 5, wherein three gears are associated with the bicycle crankshaft and said indexing means are adapted to define ten different predetermined positions of the movable control member, and wherein the correlation law applied when the chain is shifting towards smaller gears provides displaying the passage from the greatest gear to the medium gear at a position of the movable control member intermediate between the fourth and the fifth position of the movable control member, calculated starting from the end position towards the greatest gear, whereas the passage from the medium gear to the smallest gear is displayed once the last but two position is passed, whereas in the case of chain shift towards greater gears, the passage from the smallest gear to the medium gear is displayed when the fifth position of the movable control member is passed, calculated starting from the end position towards the smallest gear, whereas the passage from the medium gear to the greatest gear is displayed once the last but three position of the movable control member is passed.

* * * * *